W. HARTY.
Machine for Bending Elliptic Springs.

No. 201,607. Patented March 26, 1878.

WITNESSES:
James T. Goodfellow,
James H. Slade,

INVENTOR:
William Harty
by Austin F. Park,
Attorney.

UNITED STATES PATENT OFFICE.

WILLIAM HARTY, OF JERSEY CITY, NEW JERSEY.

IMPROVEMENT IN MACHINES FOR BENDING ELLIPTIC SPRINGS.

Specification forming part of Letters Patent No. 201,607, dated March 26, 1878; application filed March 1, 1878.

*To all whom it may concern:*

Be it known that I, WILLIAM HARTY, of Jersey City, in the county of Hudson and State of New Jersey, have invented certain new and useful Improvements in Machines for Bending Elliptic Springs, of which the following is a specification, reference being had to the accompanying drawings, in which—

Figure 1:
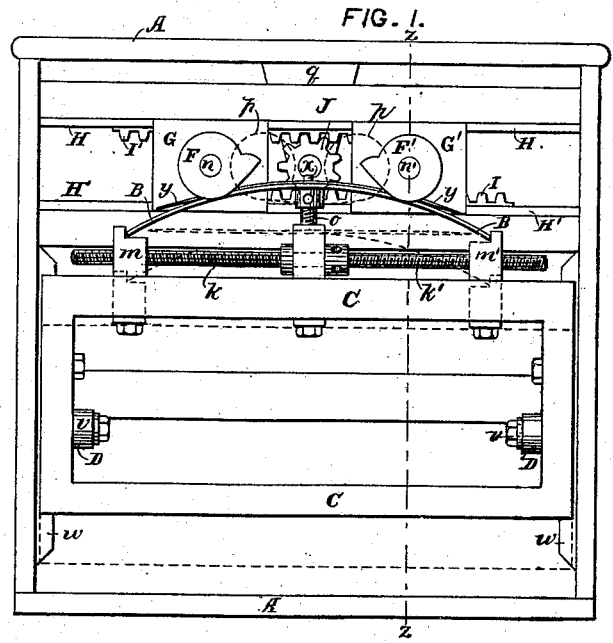
Figure 2:
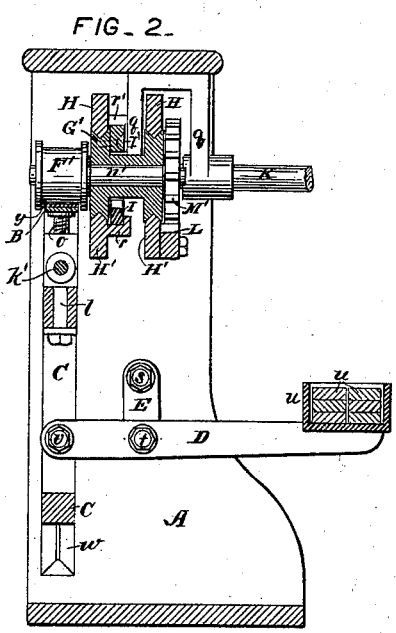
Figure 3:
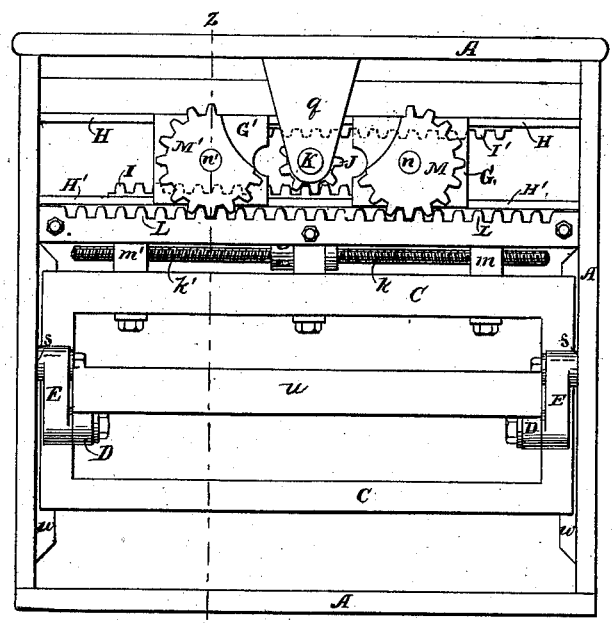
Figure 4:
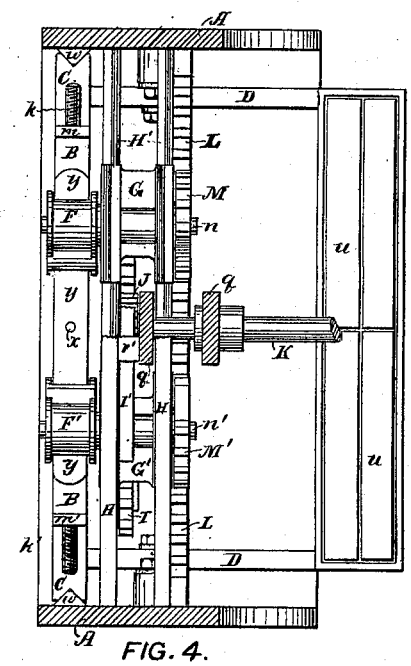

Figure 1 is a front elevation; Fig. 2, an elevation of a section at the line $z\ z$ in Figs. 1 and 3; Fig. 3, a rear elevation; and Fig. 4, a plan with some parts in section and removed, all of a machine which embodies this invention.

In the machine described in my United States Patent No. 113,164, two bending-rollers are journaled in carriers which slide on horizontal ways, and are connected to two inclined vertically-movable racks, which engage with pinions fast on the axes of the bending-rollers, so that by moving the inclined racks up and down the bending-rollers are turned about their own axes, and are at the same time moved horizontally on the ways, and along a vertically-sliding curved form-bed, which supports the blank spring-leaf to be bent, and is counterweighted, so as to constantly keep the blank-leaf in forced, but somewhat yielding, contact with the bending-rollers while they are moved horizontally.

In that machine a great amount of power was expended or absorbed in turning the rollers, and moving them along the curved bed by moving the inclined racks vertically, and the rollers were not so turned in respect to their movement along the curved bed as to tend to draw out and straighten short bends in the spring-leaf most effectually.

To avoid and overcome those defects is the more especial object of this invention, of which one part consists in the combination and arrangement of certain devices, as hereinafter described, and shown in the aforesaid drawings, whereby the bending-rollers are moved outward along and in forced, but somewhat yielding, contact with a spring-leaf on the curved form-bed.

Another part of this invention consists in the combination of certain devices, as hereinafter described, whereby the bending-rollers are moved along the curved form-bed, and are at the same time positively turned about their axes.

Another part consists in the combination and arrangement of devices, hereinafter described, whereby the bending-rollers are compelled to turn at a slower surface-speed than that at which they are moved outward along the curved form-bed, so as to thereby draw, or tend to draw, outward and straighten short bends in the spring-leaf, and make the latter more completely conform to the curved bed.

In the aforesaid drawings, A is a frame, which supports the other parts. B is a curved form-bed, by and upon which the centrally-perforated and heated spring-leaf $y$ is supported, and held in place by a pin, $x$, while being bent down upon and conformed to the bed. The bed B is mounted on a frame, C, which is fitted to slide up and down in or on ways or guides $w$, and is pivoted at $v$ to levers D, which have a weight or weights, $u$, thereon, and are pivoted at $t$ to links E, that are pivoted at $s$ to the frame A, so that the weighted levers shall more than counterbalance the frame C with the bed B thereon, and shall press and move upward the latter with much force when not prevented. F F' are two suitably-shaped bending-rollers, separately journaled in two carriers, G G', which are fitted to slide to and fro upon horizontal ways H H'. To the carriers G G' are firmly fastened separate racks I I', arranged parallel to each other and to the ways H H', and against fixed guides $r\ r'$, and one over and the other under, and both engaged with a pinion, J, fast on the driving-shaft K, journaled in fixed parts $q$ of the frame.

When the rollers F F' shall be near together, as indicated by dotted lines at $p$, Fig. 1, by then turning the pinion J in one direction, the carriers G G', with the rollers F F', will be moved apart from each other on the ways H H', and at the same time the counterweighted bed B will slide up, and keep its curved upper surface, or the leaf $y$ thereon, constantly in forced contact with the two bending-rollers F F', as the latter shall be thus moved outward on the ways H H'; and, by then turning the pinion J in the opposite direction, the carriers G G', with the rollers F F′, will be moved toward each other along the ways.

The combination of the vertically-sliding counterweighted curved form-bed B, bending-rollers F F′, carriers G G′, ways H H′, racks I I′, and pinion J, all arranged together, as above described, constitutes a very easily-operated mechanism, useful in bending the leaves of elliptic springs, whether the rollers F F′ shall be turned merely by contact with the blank leaf on the curved bed or by any suitable gearing.

L is a stationary toothed rack, parallel to the ways H H′, and M M′ are toothed segments or gears engaged with that rack, and fastened to the journal-shafts $n\, n'$ of the rollers F F′, so that the latter are thereby positively turned equally about their own axes as they are moved to and fro along the bed B, and are thus turned in the same direction that they would or might be turned by frictional contact with a blank on the bed in being moved along the latter.

I generally greatly prefer to have the gears M M′, when engaged with the rack L and fast on the rollers F F′, of somewhat greater radius than those rollers, as indicated in the drawing, in order that the rollers F F′ shall be thereby compelled to turn at a somewhat slower surface-speed than that at which they are moved outward along the curved bed B, and shall consequently somewhat drag along upon the heated leaf-blank on the bed, and thereby more effectually stretch and straighten out any short bends in the blank, and make the latter more completely conform to the curved bed, than when the gears M M′ are of no larger or smaller radius than the rollers F F′, so that the latter are compelled to turn at a surface-speed as fast as or faster than that at which they are moved outward along the curved bed.

In using the above-described improved mechanism, the counterweighted bed B is to be first depressed away from the rollers F F′, and the latter moved so as to be near together, as indicated by dotted lines at $p$, Fig. 1. Then a heated leaf-blank, $y$, is to be placed on the bed, with the pin $x$ through a hole in the middle of the blank. The bed B is next to be released, so that its counter-weight shall move it upward, so as to press the blank $y$ against the rollers F F′; and then the pinion J is to be turned, so as to simultaneously and equally slide the carriers G G′ outward from each other along the ways H H′, and thereby equally move outward the rollers F F′, while the counterweighted bed B is constantly pressed and moved upward, so as to continually compress the blank $y$ firmly between the bed and rollers F F′, and at the same time the rollers are compelled, by the fixed rack L and gears M M′, to turn at a slower surface-speed than that at which they are moved along the bed. When the rollers F F′ shall have been thus moved outward along the blank to the ends thereof, and thereby made the blank conform to the bed, the bed is then to be pressed down and the bent blank removed from the bed, and the rollers moved back to the middle, preparatory to inserting and bending another blank.

I commonly prefer to make the bed B removable, and of stiff elastic leaf-like form, supported adjustably at its middle by a screw-stud, $o$, and at its ends by holding-blocks $m\, m'$, adjustable on ways $l$ in the frame C by right and left screws $k\, k'$, so that the bed can be removed and another of different length or curvature substituted readily; but that particular construction is not an essential part of my present invention, and the vertically-sliding counterweighted bed is not, broadly, new.

What I claim as my invention is—

1. The combination of the sliding counterweighted form-bed B, bending-rollers F F′, sliding carriers G G′, stationary ways H H′, separate racks I I′, parallel to the ways and fastened to the carriers, and driving-pinion J, as shown and described.

2. The combination of the sliding form-bed B, rollers F F′, carriers G G′, ways H H′, racks I I′, pinion J, fixed rack L, and gears M M′, as described.

3. The combination of the curved bed B, traversing rollers F F′, rack L, and gears M M′, engaged with that rack and secured to the rollers, and of greater radius than the latter, whereby the rollers are compelled to turn at a slower surface-speed than that at which they are moved along the bed, as set forth.

In testimony whereof I hereunto set my hand in the presence of two subscribing witnesses this 26th day of February, 1878.

WILLIAM HARTY.

Witnesses:
JAMES H. SLADE,
JAMES T. GOODFELLOW.